United States Patent [19]

Shigeta et al.

[11] 4,446,520

[45] May 1, 1984

[54] PROCESS OF PREPARING AND PROCESSING SEWING DATA FOR AN AUTOMATIC SEWING MACHINE

[75] Inventors: Katsunori Shigeta; Takashi Nakamura, both of Aichi; Hisaichi Maruyama; Yasuji Matsumoto, both of Hyogo, all of Japan

[73] Assignee: Mitsubishi Denki Kabushiki Kaisha, Tokyo, Japan

[21] Appl. No.: 287,831

[22] Filed: Jul. 29, 1981

[30] Foreign Application Priority Data

Jul. 30, 1980 [JP] Japan ................... 55-104557
Jul. 30, 1980 [JP] Japan ................... 55-104558
Jul. 30, 1980 [JP] Japan ................... 55-104559
Jul. 30, 1980 [JP] Japan ................... 55-104560
Jul. 30, 1980 [JP] Japan ................... 55-104561
Sep. 12, 1980 [JP] Japan ................... 55-126678

[51] Int. Cl.$^3$ ............... G06F 15/46; D05B 3/02
[52] U.S. Cl. .................. 364/400; 112/121.12; 112/158 E; 364/192
[58] Field of Search ........... 364/400, 191–193, 364/200 MS File, 900 MS File; 318/568; 112/158 E, 121.11, 121.12, 275, 277

[56] References Cited

U.S. PATENT DOCUMENTS

| | | | |
|---|---|---|---|
| 4,074,642 | 2/1978 | Herr ..................... | 318/568 X |
| 4,078,253 | 3/1978 | Kajiura et al. ......... | 364/900 |
| 4,092,938 | 6/1978 | Coughenour et al. ... | 318/568 X |
| 4,108,090 | 8/1978 | Landau, Jr. et al. ... | 318/568 X |
| 4,144,827 | 3/1979 | Brown .................... | 318/568 X |
| 4,187,789 | 2/1980 | Takenoya et al. ...... | 112/158 E |
| 4,190,007 | 2/1980 | Kimura et al. ......... | 112/121.12 |
| 4,201,144 | 5/1980 | Manabe et al. ........ | 112/121.12 |
| 4,218,982 | 8/1980 | Daido et al. .......... | 112/158 E |
| 4,236,467 | 12/1980 | Tanaka et al. ........ | 112/158 E |

Primary Examiner—Joseph F. Ruggiero
Attorney, Agent, or Firm—Sughrue, Mion, Zinn, Macpeak & Seas

[57] ABSTRACT

Stitching data according to a desired sewing pattern is successively stored as incremental data between adjacent stitches. When all of the stitching data as thus stored is transferred into a storing medium for controlling feeding of cloth in an automatic sewing machine, the incremental data is successively added to compute sewing pattern coordinates. All of the sewing pattern coordinates are used to produce an image reference position of the sewing data on a monitor display screen. The image reference position and the sewing pattern coordinates are computed to produce monitor display pattern coordinates, and a sewing pattern based on the monitor display pattern coordinates is displayed on the monitor display screen to allow confirmation of the sewing data before the latter is transferred into the storing medium.

5 Claims, 13 Drawing Figures

FIG. 2
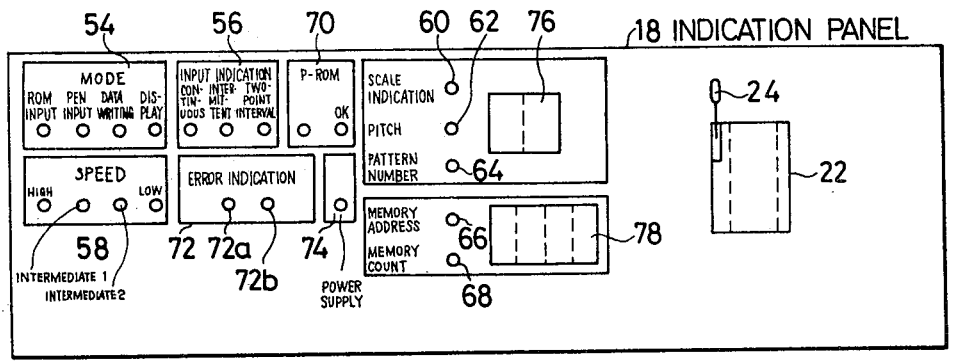
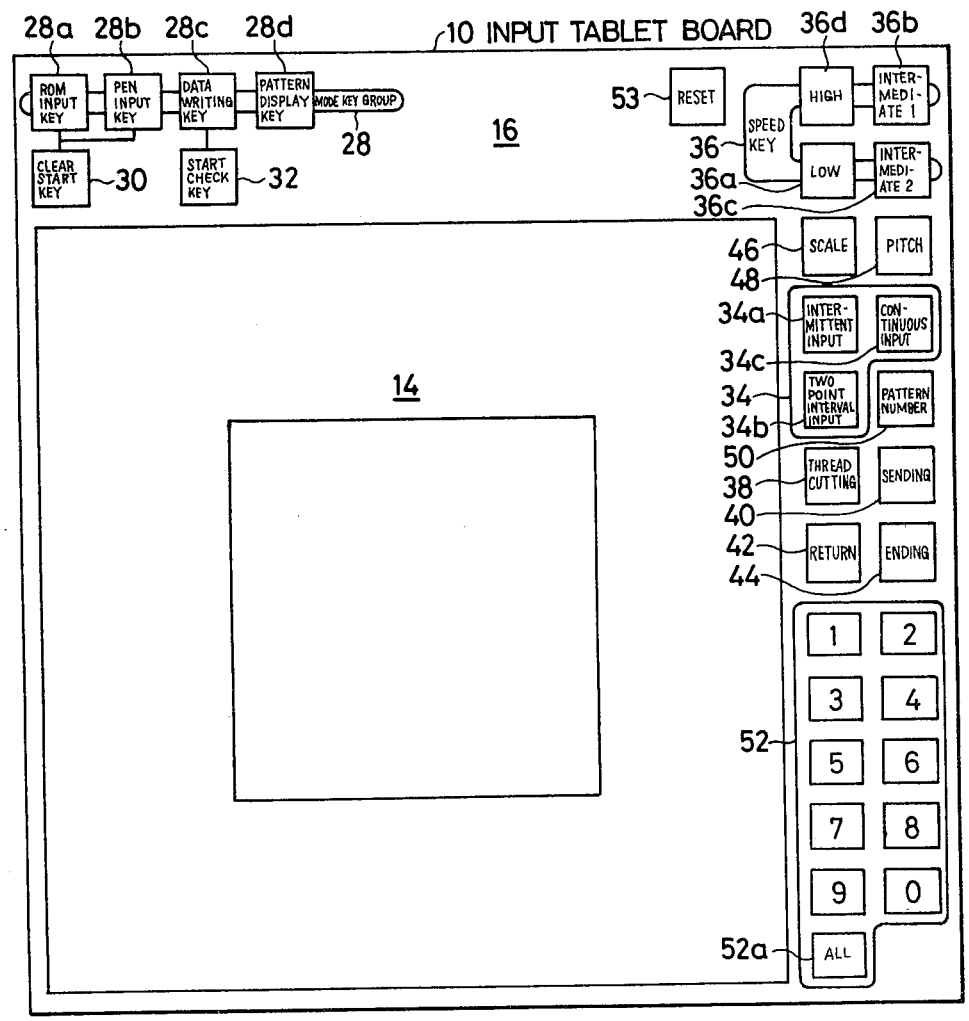

|   | $D_7$ | $D_6$ | $D_5$ | $D_4$ | $D_3$ | $D_2$ | $D_1$ | $D_0$ |
|---|---|---|---|---|---|---|---|---|
| N   X | SEWING MACHINE CONTROL | | | | X-AXIS INCREMENTAL DATA | | | |
| N+1 Y | SEWING SPEED | | | | Y-AXIS INCREMENTAL DATA | | | |

FIG. 5

|   |   | $D_7$ | $D_6$ | $D_5$ | $D_4$ | $D_3$ | $D_2$ | $D_1$ | $D_0$ |
|---|---|---|---|---|---|---|---|---|---|
| $P_0$ | $X_0$ | 0 | 0 | 1 | 0 | 0 | 0 | 0 | 0 |
|       | $Y_0$ | 0 | 1 | 1 | 0 | 0 | 0 | 0 | 0 |
| $P_1$ | $X_1$ | 0 | 0 | 1 | 0 | 1 | 0 | 1 | 0 |
|       | $Y_1$ | 0 | 1 | 1 | 0 | 0 | 1 | 0 | 1 |
| $P_2$ | $X_2$ | 0 | 0 | 1 | 0 | 1 | 0 | 1 | 0 |
|       | $Y_2$ | 0 | 1 | 1 | 0 | 0 | 1 | 0 | 1 |
| $P_3$ | $X_3$ | 0 | 0 | 1 | 0 | 1 | 0 | 1 | 0 |
|       | $Y_3$ | 0 | 1 | 1 | 0 | 0 | 1 | 0 | 1 |
| $P_4$ | $X_4$ | 0 | 0 | 1 | 0 | 1 | 0 | 1 | 0 |
|       | $Y_4$ | 0 | 1 | 1 | 0 | 0 | 1 | 0 | 1 |
| $P_5$ | $X_5$ | 0 | 0 | 1 | 0 | 1 | 0 | 1 | 0 |
|       | $Y_5$ | 0 | 1 | 1 | 0 | 0 | 1 | 0 | 1 |
| $P_6$ | $X_6$ | 0 | 0 | 1 | 0 | 0 | 0 | 0 | 0 |
|       | $Y_6$ | 1 | 1 | 1 | 0 | 0 | 1 | 0 | 1 |
| $P_7$ | $X_7$ | 0 | 0 | 1 | 0 | 0 | 0 | 0 | 0 |
|       | $Y_7$ | 1 | 1 | 1 | 0 | 1 | 0 | 1 | 0 |
| $P_8$ | $X_8$ | 0 | 0 | 1 | 0 | 0 | 0 | 0 | 0 |
|       | $Y_8$ | 1 | 1 | 1 | 0 | 1 | 0 | 1 | 0 |

FIG. 7

|       | $X_B$   | $Y_B$  |
|-------|---------|--------|
| $P_0$ | 0       | 0      |
| $P_1$ | 1010    | 101    |
| $P_2$ | 10100   | 1010   |
| $P_3$ | 11110   | 1111   |
| $P_4$ | 101000  | 10100  |
| $P_5$ | 110010  | 11001  |
| $P_6$ | 110010  | 10100  |
| $P_7$ | 110010  | 1010   |
| $P_8$ | 110010  | 0      |

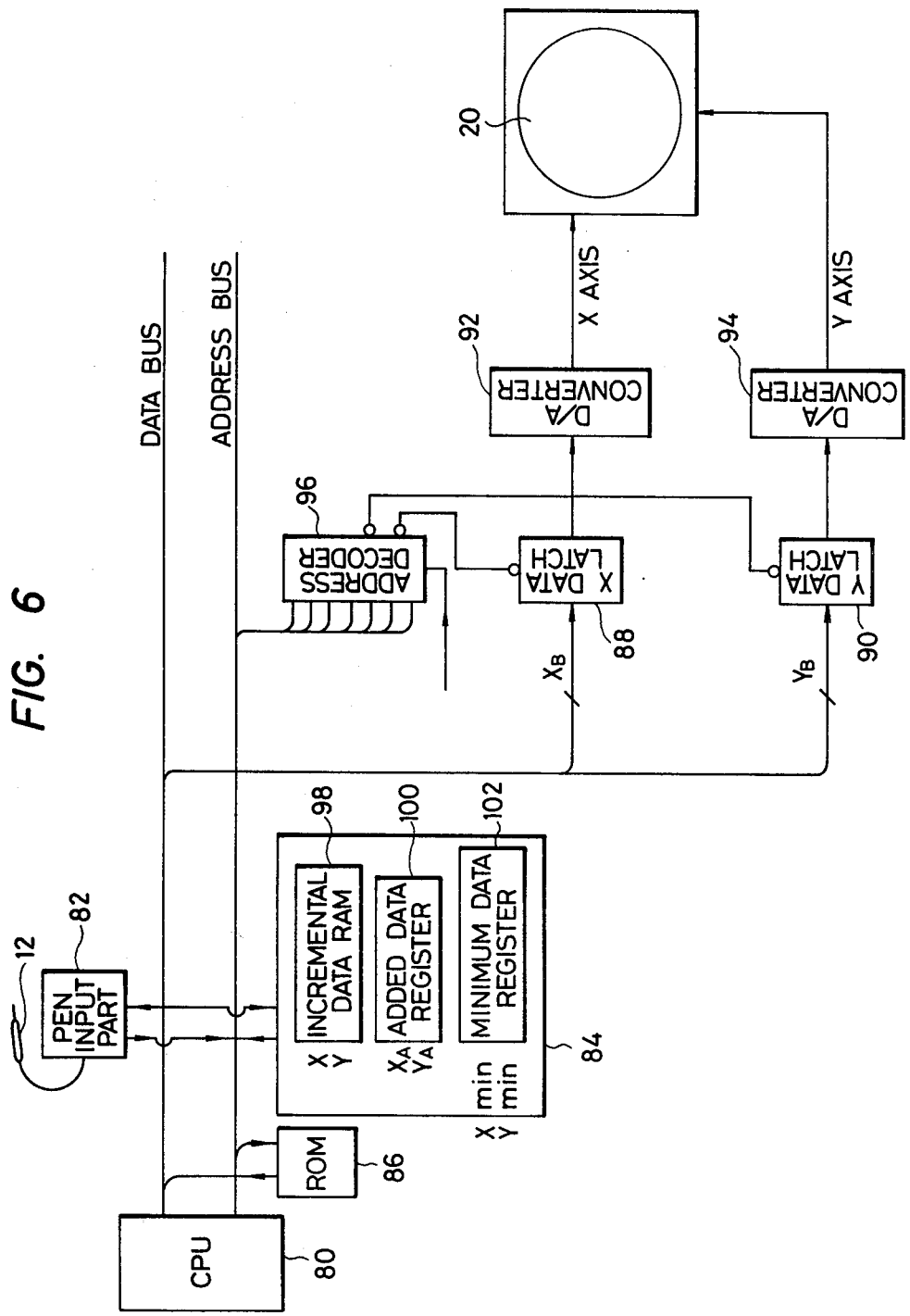

PROCESS OF PREPARING AND PROCESSING SEWING DATA FOR AN AUTOMATIC SEWING MACHINE

BACKGROUND OF THE INVENTION

The present invention relates to an improvement in a process of and an apparatus for preparing and processing sewing data for an automatic sewing machine using a storing medium.

As well known in the art, industrial electronic sewing machines include an automatic sewing mechanism having a memory which stores programmed sewing data for automatically controlling the cloth or sewing needle according to a predetermined sewing pattern based on stored sewing data, thereby automatically sewing the cloth in a desired pattern. The sewing data is written in a storing medium in the memory. The storing medium is replaceable with another storing medium such that different sewing patterns can be easily selected as desired for sewing operations, with the results that the sewing machine can economize labor and can be operated at an increased speed. The storing medium may be a semiconductor memory such as a PROM or a magnetic card on which a desired sewing pattern, sewing speed and other control data are stored in the order of sewing operations. Normally, the sewing data is composed of control commands such as an amount of relative displacement between the sewing needle and the cloth for each stitching, a sewing speed and other movements. Control information for a single sewing pattern is composed of a collection of control commands each for one stitching.

For automatic sewing of a desired pattern on an automatic sewing machine of the type described, it is therefore necessary to prepare sewing data for the desired sewing pattern and then enter such sewing data in a given storing medium.

A conventional technique of preparing such data has included the steps of writing a desired sewing pattern on section paper or the like, reading out one by one coordinates of points where the needle is to be lowered for stitching, and entering such data into the storing medium. With the conventional process, however, coordinates of needle points can easily be read out incorrectly and hence producing errors in the sewing pattern, an undue expenditure of time and labor is necessary to prepare sewing data, and sewing data for a complicated sewing pattern is difficult to prepare. Furthermore, a single known storing medium holds only one set of sewing data, resulting in less than fully effective use of storage capacity. The storing medium must in addition be removed and attached again each time data is to be read in and read out.

SUMMARY OF THE INVENTION

It is an object of the present invention to provide an improved process of preparing and processing sewing data for automatic sewing machines speedily and correctly with utmost ease.

Another object of the present invention is to provide an improved process of preparing and processing sewing data for automatic sewing machines by writing in and reading out such sewing data through effective use of storage capacity.

Still another object of the present invention is to provide an improved apparatus for preparing and processing sewing data for automatic sewing machines through effective use of a storage capacity.

The foregoing objects are achieved by a process of preparing sewing data for an automatic sewing machine including steps of successively storing for respective stitches and according to a desired sewing pattern incremental data indicative of a distance and direction between adjacent stitches, and transferring the stored data into a storing medium for controlling the feeding of cloth. The preferred process includes the steps of successively adding incremental data to compute respective sewing pattern coordinates, obtaining from all sewing pattern coordinates an image reference position of the sewing data on a monitor display, computing the image reference position and the pattern coordinates to obtain monitor display pattern coordinates, and displaying a sewing pattern derived from the sewing data as an image on the monitor display in accordance with the monitor display pattern coordinates, thereby allowing confirmation of the sewing data before the latter is transferred into the storing medium.

According to another aspect of the present invention, there is provided a process of preparing sewing data for an automatic sewing machine by bringing a stylus pen successively into contact with desired input portions of an input tablet board having a control key input section and a pattern input section to prepare sewing data according to a given pattern, and indicating procedural steps for the stylus pen on an indication panel. This process includes the steps of indicating next procedural steps on the indication panel with flickering indications each time the stylus pen actuates a control key, and selecting any one of the procedural steps indicated by actuating a corresponding control key, so that the selected procedural step is indicated by an energized indication while the other procedural steps have de-energized indications.

According to still another aspect of the present invention, there is provided a process of preparing sewing data for an automatic sewing machine by bringing a stylus pen successively into contact with desired input portions of an input tablet board having a control key input section and a pattern input section to prepare sewing data according to a given pattern, and indicating procedural steps for the stylus pen on an indication panel, wherein the process includes the step of indicating an erroneous operation when the stylus pen actuates a control key erroneously.

According to still another aspect of the present invention, there is provided a non-volatile non-destructive storing medium for storing sewing data according to a desired sewing pattern to control feeding of cloth in an automatic sewing machine based on the sewing data read out, the storing medium having a data memory for storing a plurality of sewing data and a content memory for storing top addresses of the respective sewing data to allow the plurality of sewing data to be stored and read out selectively.

According to still another aspect of the present invention, there is provided a non-volatile non-destructive storing medium having a data memory for storing therein a plurality of sewing data according to respective desired sewing patterns, the storing medium having a content memory including a data writing portion for writing top addresses of the respective sewing data and a data read-out portion for reading a desired top address selectively out of the content memory to read out sewing data corresponding to the top address thus read out.

According to still another aspect of the present invention, there is provided a non-volatile non-destructive storing medium for storing sewing data according to a desired sewing pattern to control feeding of cloth in an automatic sewing machine based on the sewing data read out, the storing medium having a data memory for storing a plurality of sewing data and a content memory for storing top addresses of the respective sewing data. In accordance with the invention the sewing data is successively stored from the top addresses, and the sewing data storing memory having partly written in sewing data has an empty memory region thereof automatically indicated for storing new sewing data.

BRIEF DESCRIPTION OF THE DRAWINGS

FIG. 2 is an enlarged plan view of an input tablet board and a display panel shown in FIG. 1;

FIG. 5 is a view showing sewing data corresponding to the sewing pattern shown in FIG. 4;

FIG. 6 is a block diagram of a processing circuit for effecting conversion between incremental data and absolute data;

FIG. 7 is a view illustrative of absolute data converted by the processing circuit of FIG. 6;

DESCRIPTION OF THE PREFERRED EMBODIMENTS

Figure 1:
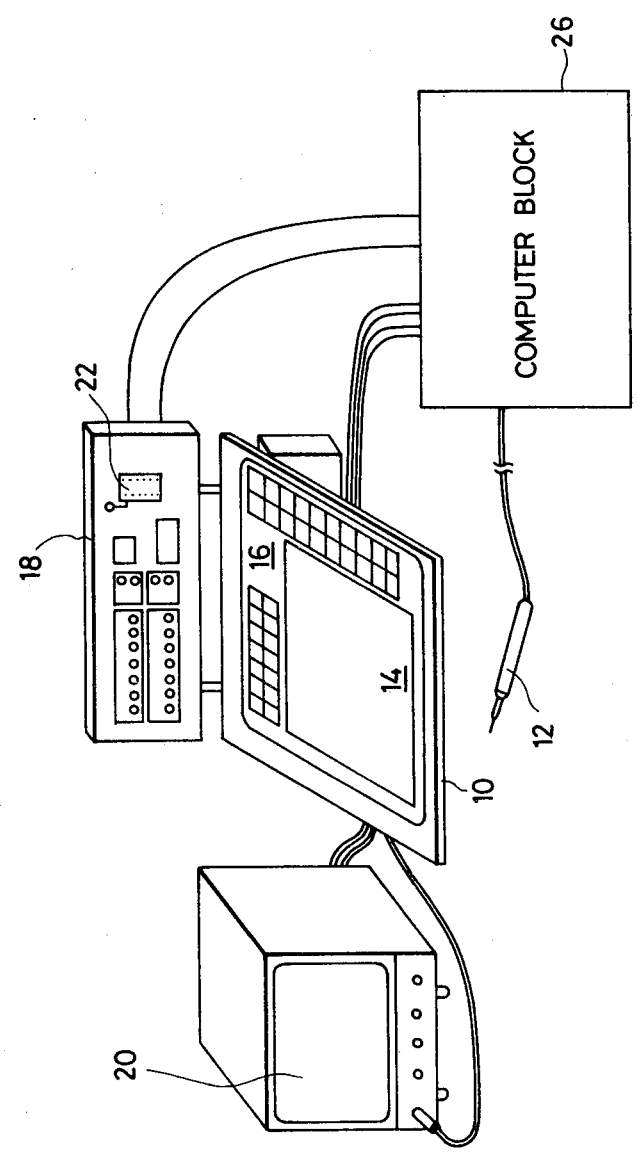
FIG. 1 is a perspective view of an apparatus for preparing and processing data according to the present invention.

As shown in FIG. 1, a data preparation apparatus for carrying out a process of preparing sewing data according to the present invention includes an input tablet board 10 and a stylus pen 12 which can be brought into contact with the input tablet board 10 at a desired position thereof to cause the input tablet board 10 to produce a writing input signal corresponding to the position where the stylus pen 12 is held against the stylus board 12.

The input tablet board 10 is divided into two parts, as illustrated in FIG. 2, one part being a pattern input section 14 capable of receiving as an image input a desired sewing pattern, and the other part being a control key input section 16 disposed along sides of the pattern input section 14 and having control keys. When the stylus pen 12 is brought into contact with the pattern input section 14 at a desired position thereof, the pattern input section 14 generates a signal which is indicative of coordinates of such a desired position. A desired key can be actuated to receive a key input by bringing the stylus pen 12 into contact with such a desired key on the control key input section 16.

As illustrated in FIG. 1, the data preparation apparatus also includes an indication panel 18 for indicating the order of actuation of control keys and a CRT display 20 for displaying a sewing pattern supplied as an input via the pattern input section 14. Thus, the indication panel 18 can indicate procedural steps for preparing sewing data to the operator, and the sewing data thus prepared can be monitored on the CRT display 20 before such data is written in a storing medium.

The indication panel 18 has a socket 22 for PROMs which serve as storing media when inserted in the socket 22 for storing sewing data written therein. FIG. 2 shows in more detail the indication panel 18. Procedural steps are indicated by lamps such as light-emitting diodes and numeral indications. The PROM can easily be inserted in and removed from the socket 22 by operating a handle 24. In FIG. 1, the input tablet board 10, the stylus pen 12, the indication panel 18 and the CRT display 20 are connected to a computer block 26 which supplies control commands to perform various functions such as preparation of sewing data, reading-out of sewing data from the storing medium, and other operations.

The control key input section 16 in the input tablet board 10 includes a number of divisions which when depressed by the stylus pen 12, enable the computer block 26 to identify positions of the depressed divisions for processing operations corresponding to such depressed divisions. Therefore, the input tablet board 10 functions as if it had a plurality of independent control keys.

The divisions or "keys" contained in the control key input section 16 of FIG. 2 have the following functions:
1. A mode key group 28 switches the data preparation apparatus into the following four modes;

A ROM input key 28a causes data to be read out of a ROM set in the socket 22 and to be transferred to a temporary memory in the data preparation apparatus. The ROM input key 28a is used when transferring data from the ROM, compiling such data, and checking the content thereof.

A pen input key 28b causes image data of a sewing pattern described by the stylus pen 12 on the pattern input section 14 as an input to be written in the temporary memory.

A data writing key 28c causes sewing data written in the temporary memory to be written in the PROM.

A pattern display key 28d causes the sewing pattern written in the temporary memory to be indicated on the CRT display 20.
2. A data input key group instructs starting of inputting data:

A clear start key 30 instructs starting of inputting data from an ROM and the stylus pen.

A start check key 32 instructs starting of writing data in a ROM.
3. A data input system key group 34 selects three data input systems when inputting data through the stylus pen.

A single needle input key 34a instructs each needle-lowering position indicated by the stylus pen 12 on the pattern input section 14.

A two-point interval input key 34b causes a straightline interval between two points selected by the stylus pen 12 to be converted into needle stitching data at predetermined equal pitches.

A continuous input key 34 causes a pattern or path described by the stylus pen 12 on the pattern input section 14 to be directly converted into needle stitching data.

4. A sewing speed key group 36 selects four speeds by depressing a low-speed key 36a, a first medium-speed key 36b, a second medium-speed key 36c, and a high-speed key 36d.
5. A automatic thread cutting key 38 instructs a thread to be cut.
6. A cloth feed key 40 causes cloth only to be fed without effecting a sewing operation.
7. A table return key 42 causes a cloth feeding table to be automatically returned to a data inputting start position.
8. An ending key 44 instructs completion of data inputting.
9. A scale key 46 instructs scales of a sewing pattern and an actual article to be sewn.
10. A stitch number key 48 instructs a pitch of stitches.
11. A pattern number ky 50 instructs a pattern number when inputting data from and writing data in a ROM.
12. A numbering key group 52 includes keys 0 through 9 and a full key 52a for instructing pitches, scales, pattern numbers and the like.

These control keys of the control key input section 16 in the input tablet board 10 are selectively actuated by the stylus pen 12 to indicate a procedure for preparing desired data. The procedural steps can be successively displayed on the display panel 18.

The indication panel 18 includes the following indicators corresponding to the keys of the controls key input section 16:

1. A mode indicator 54;
2. A data input system indicator 56;
3. A sewing speed indicator 58;
4. Scale, stitch pitch and pattern number indicators 60, 62, 64.

The indication panel 18 also has the following indications:

5. ROM address and memory number indicators 66, 68: These indicate a top writing address when writing data in a ROM, and the number of memories used for preparing data and the number of memories used for a corresponding pattern when inputting data in a ROM.
6. A ROM writing operation indicator 70: This indication indicates the condition in which data is then written in a ROM has been terminated.
7. An error indicator 12: This indicates correctable erroneous operations and non-correctable erroneous operations.
8. A power supply indicator 74: This indicates whether the power supply is switched on or off.

The data preparation apparatus can be used to prepare a variety of sewing data, or read sewing data out of the storing medium such as a PROM merely for display on the CRT display 20.

Sewing data is normally prepared by drawing a desired sewing pattern with the stylus pen 12 on the pattern input section 14 in the input tablet board 10 and writing the sewing pattern in a PROM, by a procedure called "stylus pen inputting," or by reading sewing data out of a PROM prepared in advance and transferring the data to another PROM, or a procedure called "PROM inputting." In either case, the data preparation apparatus includes a temporary memory such as a RAM for temporarily storing data indicated by the stylus pen or ROM. The contents thus stored are monitored on the CRT display, and then are transferred to and stored in a PROM inserted in the socket 22.

When data is supplied as an input, particularly, when a desired sewing pattern is described by the stylus pen 12 on the pattern input section 14 by stylus pen inputting, the procedure for operating the stylus pen 12 is relatively complicated, resulting in a possibility of erroneous operations.

According to the present invention, such erroneous operations during data processing can be prevented by making a flickering indication on the indicator panel 18 for subsequent procedural steps each time the stylus pen 12 actuates a control key, and depressing the key for a selected procedural step indicated by the stylus pen 12 to enable the lamp for the selected procedural step to be turned on and the other lamps for the non-selected procedural steps to be turned off, whereby complicated procedural steps can be followed by an unskilled operator for correct preparation of data.

Complicated procedural steps for preparing data by way of stylus pen inputting will be described in detail.

1. Data input to the temporary memory.

1-1. When the power supply is switched on, the four mode indicators 54 flicker. The operator selects a desired key in the mode key group 28 in the control key input section 16 in the input tablet board 10, and depresses the key with the stylus pen 12, the key being the stylus pen input key 28b in this example of operation. Advantageously, actuation of one of the mode keys 28 when the mode indicators 54 flicker causes such flickering of the mode indicators 54 to stop except the mode indication corresponding to the stylus pen mode indicators are turned off. As a result, the operator can prepare sewing data while confirming each procedural step, and hence can follow the required procedural steps with the possibility of making errors being reliably eliminated.

When the stylus pen 12 makes an error on the input tablet board 10 against the procedural step indicated by a lighting on the indication panel 18, such an erroneous operation is indicated on the indicator panel 18 to allow the operator to confirm the error and the procedural step to be followed. For this purpose, the indicator panel 18 has, as described above, the error indicator group 72 which includes the first error indicator 72 for indicating a correctable erroneous operation and the second error indicator 72b for indicating an erroneous operation that cannot be corrected.

Such error indication will be made as when the stylus pen 12 depresses one of the speed keys 36 instead of one of the mode keys 28 which in fact should be selected. When such an erroneous operation is made, one of the error indicators 72 is turned on or flickers, which here is the error indicator 72a since selection of one of the speed keys 36 at this time does not adversely effect data prepared already and hence is correctable. There may be provided a buzzer for giving the operator a warning simultaneously with energization or flickering of one of the error indications. When such a correctable error occurs, a proper key is then depressed with the stylus pen to de-energize the first error indicator 72 for continuous data preparation. More specifically, the stylus pen input key 28b in the mode key group 28 is depressed with the stylus pen 12 to nullify the selection of one of the speed keys 36 and to allow data to be continuously prepared with the operation of the stylus pen input key 28b.

1-2. The indication of a scale is requested when the scale indicator 60 flickers. The operator then designates a desired scale with the numbering keys 52 and the scale key 46 in the control key input section 16. If this operation has been completed without error, the scale indicator 60 stops flickering and the selected scale is indicated by a numeral indicator 76. If the scale selection is erroneous, the error indicator 72 is energized to let the operator confirm the proper procedural step and correct the error.

1-3. The instruction of the pitch of a stitch is requested when the pitch indicator 62 flickers. The pitch of a stitch is instructed with the numbering keys 52 and the stitch pitch key 48. When a pitch is designated correctly, the flickering of the pitch indicator 62 stops and the pitch indicator 62 is continuously energized. At the same time, the numeral indicator 76 displays a designated pitch of stitching.

1-4. The selection of sewing speed is requested when the four lamps of the speed indicator 58 flicker. The operator then selects one of the speed keys 36, whereupon a selected one of the speed indicators 58 stops flickering and is energized while the other speed indicators 58 which are not selected are deenergized.

1-5. The selection of an input system is requested when the data input system indicators 56 flicker. In the illustrated embodiment, three data input systems are available. The single need input system allows stitches to be formed only at positions where the stylus pen 12 contacts the pattern input section 14. The two-input interval input system allows the interval between two points indicated by the stylus pen 12 to be divided by the selected pitch of stitching. The continuous input system allows stitches to be formed at the selected stitching pitch continuously along a desired pattern described by the stylus pen 12 on the pattern input section 14. When a desired data input system is selected, only the indicator lamp which corresponds to the selected data input system is energized and the other indicator lamps are de-energized to indicate to the operator that the desired input system is properly selected.

1-6. The operation of the start key is requested when one of the mode selection indicators, here the stylus pen input indication, when has been energized starts flickering. The operator then depresses the clear start key 30 with the stylus pen 12 for the stylus pen inputting, whereupon the stylus pen indicator stops flickering and is continuously energized again. The memory number indicator 68 on the display panel 18 is now turned on and a numeral indicator 78 indicates the number of temporary memories.

1-7. The data of a stitch pattern is delivered as an input by bringing the stylus pen 12 into contact with the pattern input section 14. The automatic thread cutting key 38, the cloth feed key 40 or the table return key 42 is actuated as desired. When the pattern data has been fed as an input, the end key 44 is actuated. Simultaneously with the actuation of the end key 44, all of the mode indicators 54 start flickering to request that a next procedural step be selected.

In this manner, pattern data corresponding to a desired sewing pattern described by the stylus pen 12 is stored in the temporary memories in the data preparation apparatus. As described above, each procedural step is indicated each time lamp indicators on the indication panel 18 flicker, so that the operator can prepare sewing data easily in accordance with a proper procedure. Furthermore, the error indicators 72 are energized each time an erroneous operation occurs, thereby avoiding the possibility of the operator continuing data preparation without noticing errors made.

2. Monitor indication on the CRT display 20 (confirmation of data written in temporary memories)

2-1. The selection of one of the mode keys 28 is requested when the mode indicators 54 flicker. In this example of operation, the pattern indication key 28d is selected to allow only the monitor indicator lamps of the mode indicators 54 to be energized.

2-2. Data written in the temporary memories is displayed as an image on the CRT display 20. Since the data stored in the temporary memories is not indicative of absolute coordinates of stitches, it is necessary to convert such incremental data into absolute data capable of being displayed on the monitor display before the data is indicated as an image on the CRT display 20. Stated otherwise, automatic sewing machines normally have a cloth feeding control unit for successively feeding the cloth for each stitch according sewing data, and hence incremental sewing data should be stored in a memory for each sewing stitch.

Figures 3, 4:
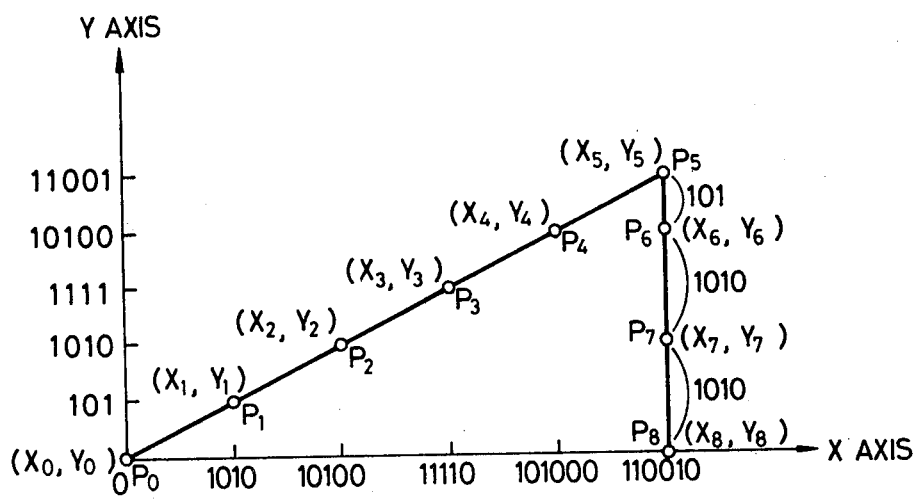
FIG. 3 shows a portion of sewing data used for the present invention.
FIG. 4 is a view showing a sewing pattern to be processed according to the present invention.

FIG. 3 illustrates sewing data of the type described. X-axis data and Y-axis data is written at an address N and an address (N+1), respectively. This data is processed as 8-bit digital signals in FIG. 3. Incremental data for the X or Y axis is written as 5 bits from $D_0$ to $D_4$. Control signals for the sewing machine, such as commands for stopping and operating the sewing machine, and for cutting and playing out the thread, are written as bits $D_5$ and $D_6$ at the address N, and a command for a sewing speed is written as bits $D_5$ and $D_6$ at the address (N+1). Directions of feeding of the cloth along the X and Y axes are written as bits $D_7$ at both addresses. Thus, one stitch (coordinates of a point where the needle is to be lowered) can be indicated by the two addresses N and N+1.

FIG. 4 illustrates an actual sewing pattern having stitches extending from a starting point $P_0$ to a fifth stitch $P_5$ spaced at equal intervals along a straight line, and stitches $P_5$ to $P_8$ located along a straight line parallel to the X axis. FIG. 5 shows sewing data for such nine stitches. In FIG. 5, a sign "0" of the bit $D_7$ indicates a positive direction of feeding and a sign "1" indicates a negative direction of feeding. "01" at the bits $D_5$ and $D_6$ indicates a command for operating the sewing machine, and "11" indicates a high sewing speed. As can be seen from FIG. 5, the sewing pattern of FIG. 4 is sewn at a constant high speed.

The incremental data, the bits $D_0$ to $D_5$ in FIG. 5, is indicative only of increments between adjacent stitches and not of absolute positions of X and Y coordinates. Therefore, such sewing data cannot be supplied directly to the CRT display 20 for monitoring the sewing pattern.

According to the illustrated embodiment, incremental data for respective stitches is successively added together to compute coordinates of the sewing pattern, and such absolute sewing pattern coordinates are indicated on the CRT display 20. There are some instances, however, in which such simple successive addition of incremental data will not result in displaying sewing pattern coordinates properly on the CRT display 20.

For example, the starting point $P_0$ for the sewing pattern may not necessarily coincide with the coordinates origin on the CRT display 20 or a point for starting displaying the pattern, with the result that mere coordinate indication may cause the sewing pattern to be placed off the display screen. According to the illustrated embodiment, the sewing pattern coordinates described above are first computed with respect to all of the stitches to obtain a reference position of the image of the sewing data on the monitor display, and then the image reference position and the sewing pattern coordinates are computed to obtain pattern coordinates to be displayed on the monitor, thereby displaying the pattern of sewing data on the monitor display in accordance with the monitor display pattern coordinates thus adjusted for indication on the display screen. Such image indication on the monitor display enables the operator to confirm the sewing stitch data before the data is transferred into a storing medium such as a PROM.

FIG. 6 shows in block form a preferred form of a control unit for displaying on the monitor sewing data stored in the temporary memories, the control unit here being the computer block 26. The computer block 26 includes a CPU 80 for processing various control key signals and image signals supplied from the stylus pen 82. Such signals are then written as sewing data in a temporary memory, which is here shown to be a RAM 84, and after they are displayed on the monitor, the signals are written as sewing data in a storing medium or RAM 86. Pattern data which has been converted to have absolute values for monitoring is first stored in an X-data latch 88 and a Y-data latch 90, and stored data is converted by digital-to-analog converters 92 and 94 into analog signals which are then displayed as an image on the CRT display 20. An address decoder 96 controls data latches 88 and 90 to enable the CPU 88 to select addresses in the data latches 88 and 90. The RAM 84 contains an incremental data RAM 98 for storing incremental data supplied from the stylus pen 12 during data inputting operation, an added data register 100 for storing added data for monitor indication, and a minimum data register 102 for determining an image reference position on the CRT display 20.

Conversion of incremental data into absolute data in the processing unit illustrated in FIG. 6 will be described. When the stylus pen 12 depresses the pattern indicator key 28d, incremental data stored in the incremental data RAM 98 is added together successively to obtain an image reference position on the CRT display 20. In the illustrated embodiment, an image reference position is determined by retrieving minimum data of absolute values of a sewing pattern, and the stitch which has such minimum data is established at the display origin on the CRT display 20, with the result that the sewing pattern can reliably be prevented from being placed off the display screen.

For retrieval of the minimum data, the data in the incremental data RAM 98 is successively added and stored in the added data register 100. Pattern coordinates XA, YA at this time are obtained and are successively compared and held in the minimum data register 102. Stated otherwise, the minimum data register retrieves minimum values of respective pattern coordinates XA, YA, and stores such minimum values.

After all of the incremental data has been thus added once and minimum data ($X_{min}$, $Y_{min}$) has been stored, incremental data (X, Y) is successively added again and sewing pattern coordinates XA, YA are successively stored in the added data register 100 temporarily. When incremental data is added for the second time or thereafter, the CPU 80 computes the added sewing pattern coordinates XA, YA and minimum data $X_{min}$, $Y_{min}$ to obtain monitor display pattern coordinates XB, YB, which are then supplied respectively to the X-data latch 88 and the Y-data latch 90 under the command of the address decoder 96.

FIG. 7 is illustrative of monitor display pattern coordinates XB, YB for the sewing pattern shown in FIG. 4. The coordinates are converted by the converters 92 and 94 into analog signals, which are displayed as an image on the CRT display 20. Therefore, the CRT display 20 effects monitor display with the stitch of minimum data located at the coordinates position to allow the sewing data stored in the RAM 98 to be confirmed in advance.

Incremental data is successively added for the first time to obtain minimum data. Then, with the minimum data used, successive addition of data is repeated and computation with the minimum data is repeated. With such a mode of operation, the data latches 88 and 90 may be of such a capacity as to store a single set of monitor display pattern coordinates, and hence can be small in size and inexpensive. While a sewing pattern is being displayed on the CRT display 20, the CPU 80 successively adds incremental data and repeats computation with minimum data.

2-3. When the pattern indicated on the CRT display 20 coincides with a desired sewing pattern, the operator depresses a reset key 53 on the control key input section 16 to finish monitoring operations. Upon actuation of the reset key 53, the mode indicators 54 flicker to request the operator to write data in the ROM.

3. Writing data in ROM

As described above, after sewing data written in the temporary memory RAM 98 has been confirmed on the monitor display 20, the sewing data will be transferred into the ROM 86.

3-1. The mode indicators 54 flicker to request selection of writing data. The operator inserts a desired PROM in the PROM socket 22 on the indication panel 18, and actuates the data writing key 28c with the stylus pen 12. As a result, only the writing mode indicator is energized and the other mode indicator lamps are de-energized.

3-2. The start check key 32 is now selected to enable the content of the RAM 98 to be transferred into the PROM. When the data has been properly transferred into the PROM, an OK lamp of the ROM writing operation indicator 70 is turned on to indicate that writing operation has been completed, whereupon all of the sewing data preparing operation is finished.

When the PROM is not properly set in the PROM socket 22, for example, the second error indicator 72b is turned on to indicate a non-correctable erroneous operation, requesting the operator to renew writing of data in the ROM.

Figure 8:
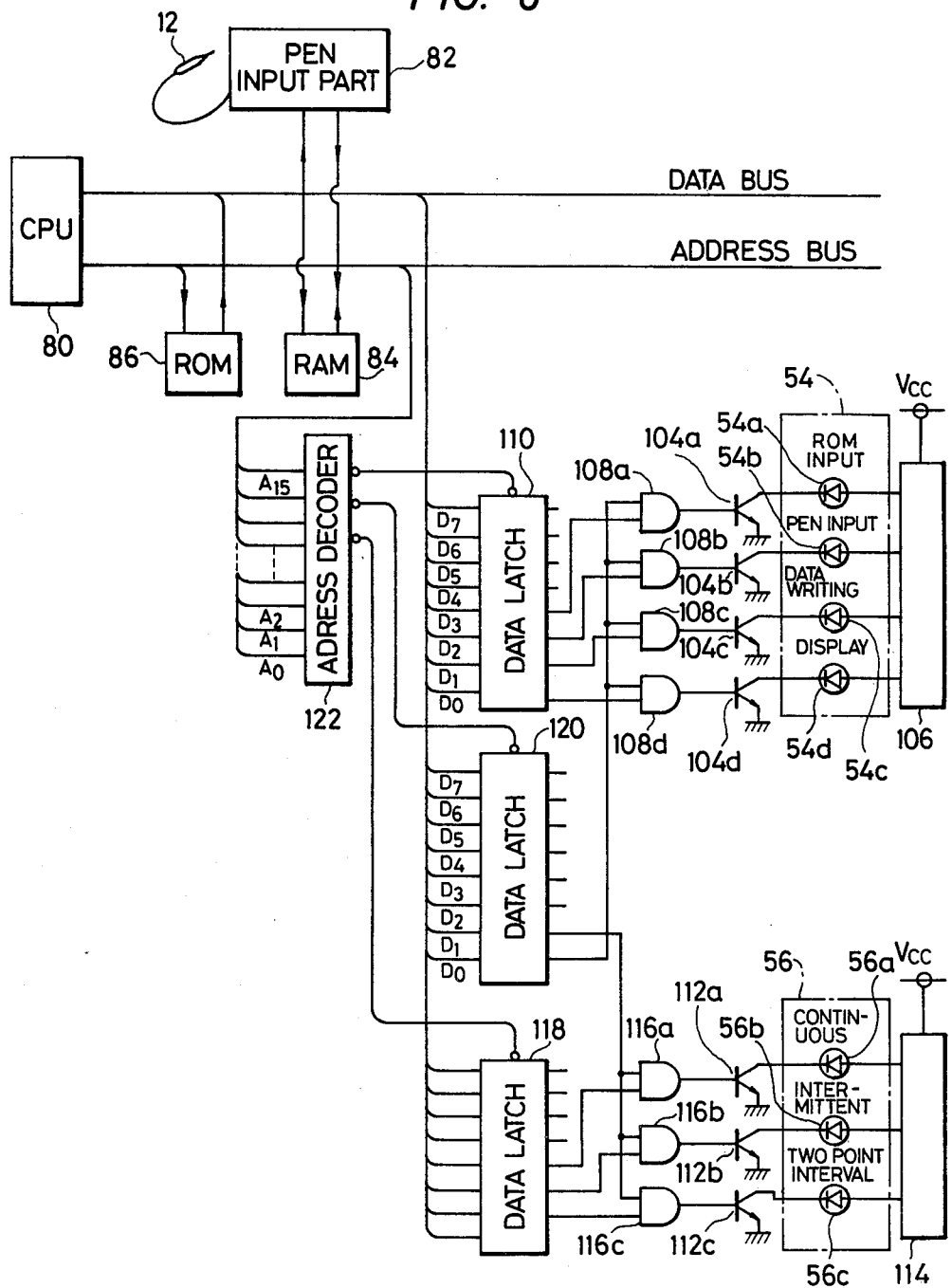
FIG. 8 is a block diagram of a processing circuit for indicating procedural steps in a process of preparing and processing sewing data according to the present invention.

According to another embodiment shown in FIG. 8, only mode indicator 54 and data input system indicator 56 are shown, and they include functions for causing flickering indications for procedural steps.

The mode indicator 54 includes four light-emitting diodes 54a, 54b, 54c and 54d indicative respectively of ROM inputting, stylus pen inputting, writing, and indication modes, the light-emitting diodes being drivable respectively by driver transistors 104a, 104b, 104c and 104d and connected to a resistor module 106. The driver transistors are supplied with control signals through their gates 108a, 108b, 108c and 108d, respectively, which are supplied with control signals from a data latch 110.

Likewise, the data input system indication 56 includes three light-emitting diodes 56a, 56b and 56c indicative respectively of continuous inputting, single-needle inputting and two-point interval inputting modes, the light-emitting diodes being connected to driver transistors 112a, 112b and 112c, respectively, and to a resistor module 114. The driver transistors 112a, 112b and 112c are supplied with driving signals from gates 116a, 116b and 116c, respectively, which are supplied with control signals from a data latch 118.

To select either the mode indicator 54 or the data input system indicator 56, there is provided another data latch 120 for producing signals to select either the group of gates 108a–108d or the group of gates 116a–116c. The data latches 110, 118 and 120 are controlled by an address decoder 122.

With such an arrangement, the address decoder 122 is responsive to procedural steps stored in the CPU 80 for successively energizing the indicators via the data latch 120.

As described before, the mode indicators 54 are normally selected at first. When the gate group 108 is open, the CPU 80 supplies all of the gates 108a–108d with flickering signals from the data latch 110 via the address decoder 122, whereupon all of the light-emitting diodes in the mode indicator 54 start flickering. When the stylus pen 12 selects any proper key on the control key input section 16, such selection enables the CPU 80 to control the data latch 120 via the address decoder 122 to produce a selected energized indicator output. As a result, only the light-emitting diode 54b for a stylus pen inputting mode is supplied with a signal for its energization, and no driving current is supplied to the other light-emitting diodes so that their indicators are de-energized.

Then, the CPU 80 successively selects appropriate indicators via the data latch 120 to indicate procedural steps as described above.

The data input system indicator 56 shown in FIG. 8 causes its all light-emitting diodes to flicker at an initial stage as with the mode indicator 54. When any control key is properly selected, only the indication corresponding to the selected key is energized with the other indicator de-energized.

According to the embodiment of FIG. 8, as described above, the data latch 120 selects indicator blocks, and either the data latch 110 or 118 selects a plurality of indicator elements in the selected indicator block to request the operator to indicate a desired procedural step.

While in the foregoing embodiments data is prepared by writing a desired sewing pattern with the stylus pen 12 through the pattern input section 14 into the storing medium, data may be reproduced by inserting a standard ROM in the PROM socket 22, transferring sewing data from the standard ROM into a RAM in the data preparation apparatus, then placing a new PROM in the socket 22, and transferring the sewing data from the RAM into the new PROM. It is also possible to compile sewing data in an existing ROM as desired.

Figure 12:
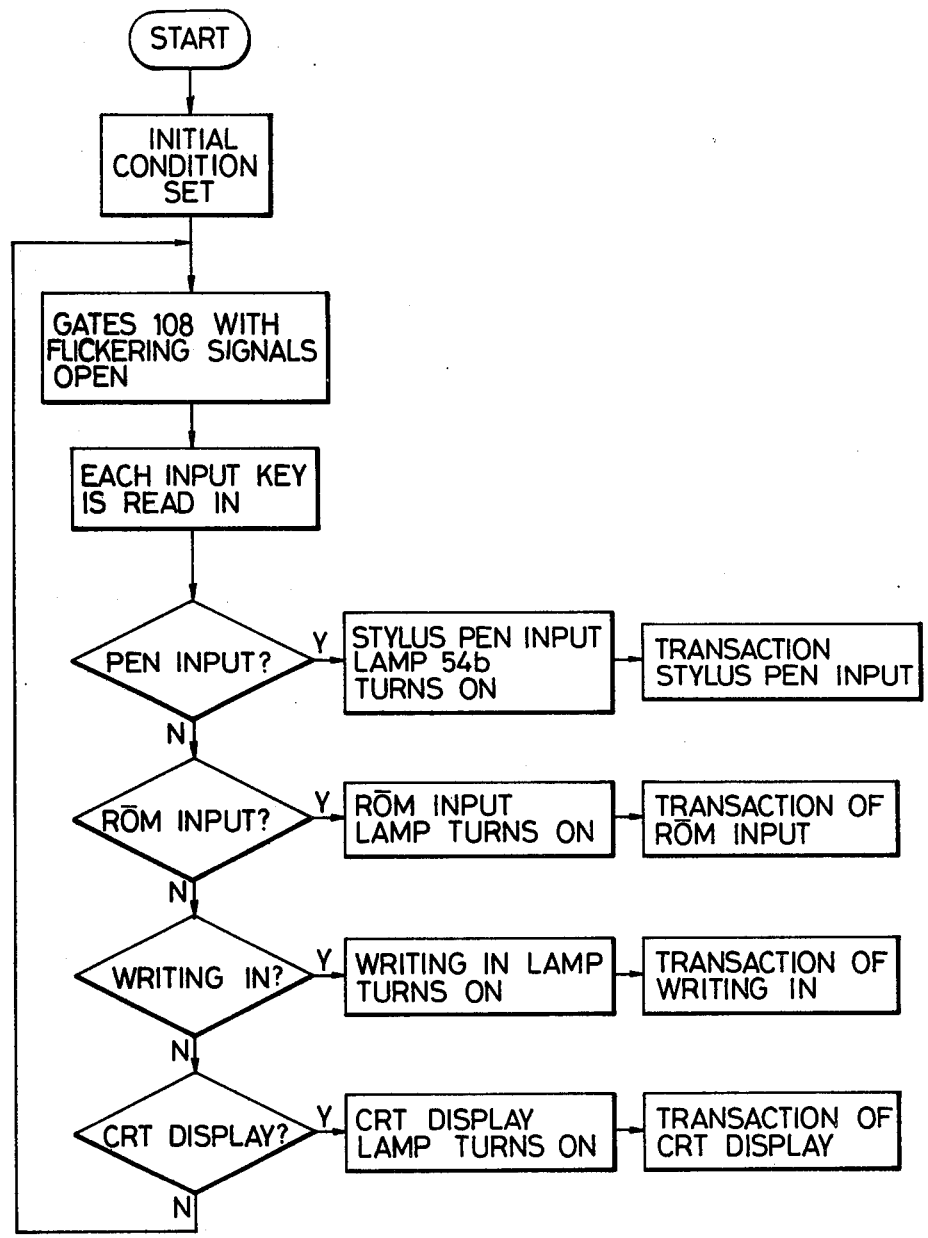
FIG. 12 is a flowchart related to the operation of the embodiment shown in FIG. 8.

FIG. 12 is a flow chart showing the operations of the embodiment of FIG. 8.

Figure 9:
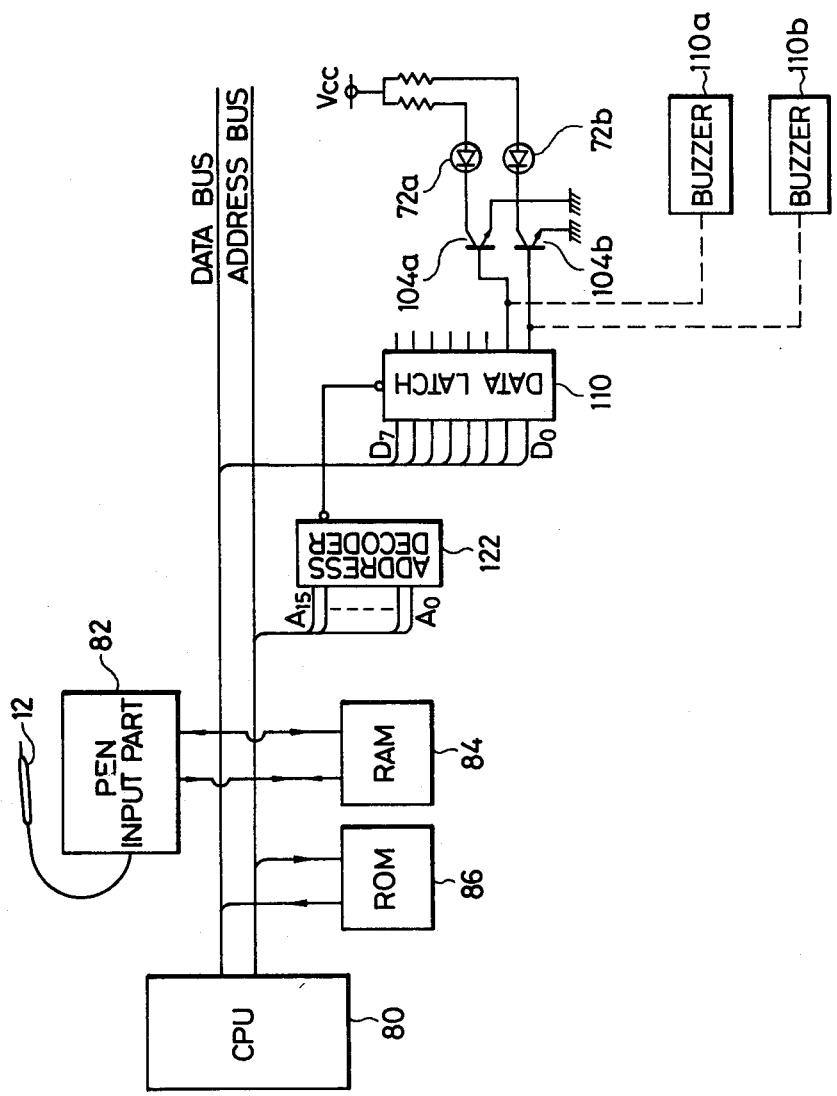
FIG. 9 is a block diagram of a processing circuit for indicating an erroneous operation.

FIG. 9 illustrates still another embodiment in which error indicators 72a, 72b are energized by driver transistors 104a and 104b, respectively, which are energized by a data latch 110 supplied with address signals from an address decoder 122 controlled by the CPU 80.

When an erroneous operation occurs, the CPU 80 determines whether the erroneous operation is correctable or not and, based on the determination, controls the address decoder 122 to enable the data latch 110 to produce a selected output which enables either the error indicator 72a or 72b to be turned on or flicker, selectively. In addition to the error indicators 72a and 72b, buzzers 110a, 110b may be provided to generate a buzzing sound for advising the operator of an erroneous operation.

In the foregoing description, correctable erroneous operations include inputs made for procedural steps other than those shown by flickering indicators and a non-correctable erroneous operations include improper insertion of a PROM in the socket. Operations may also be erroneous as when the stitching pitch exceeds a predetermined interval in the course of supplying single-needle inputs, the stitching pitch and scale exceed predetermined intervals, and the sewing pattern is out of an effective area in the pattern input section 14.

Operations may be erroneous, but not correctable when the speed at which the stylus pen 12 continuously inputs a pattern exceeds a processing speed. In this case, the error indicator 72b is energized, and the stylus pen 12 should be moved back until the error indicator 72b becomes de-energized for continuously drawing the pattern. The operation is also erroneous and non-correctable when sewing data is supplied as an input to the point where it exceeds the capacity of the ROM.

While in the above-mentioned embodiment data is prepared by writing a desired sewing pattern with the stylus pen 12 through the pattern input section 14 into the storing medium, data may be reproduced by inserting a standard ROM in the PROM socket 22, transferring sewing data from the standard ROM into a RAM in the data preparation apparatus, then placing a new PROM in the socket 22, and transferring the sewing data from the RAM into the new PROM. It is also possible to compile sewing data in an existing ROM as desired.

Figure 10:
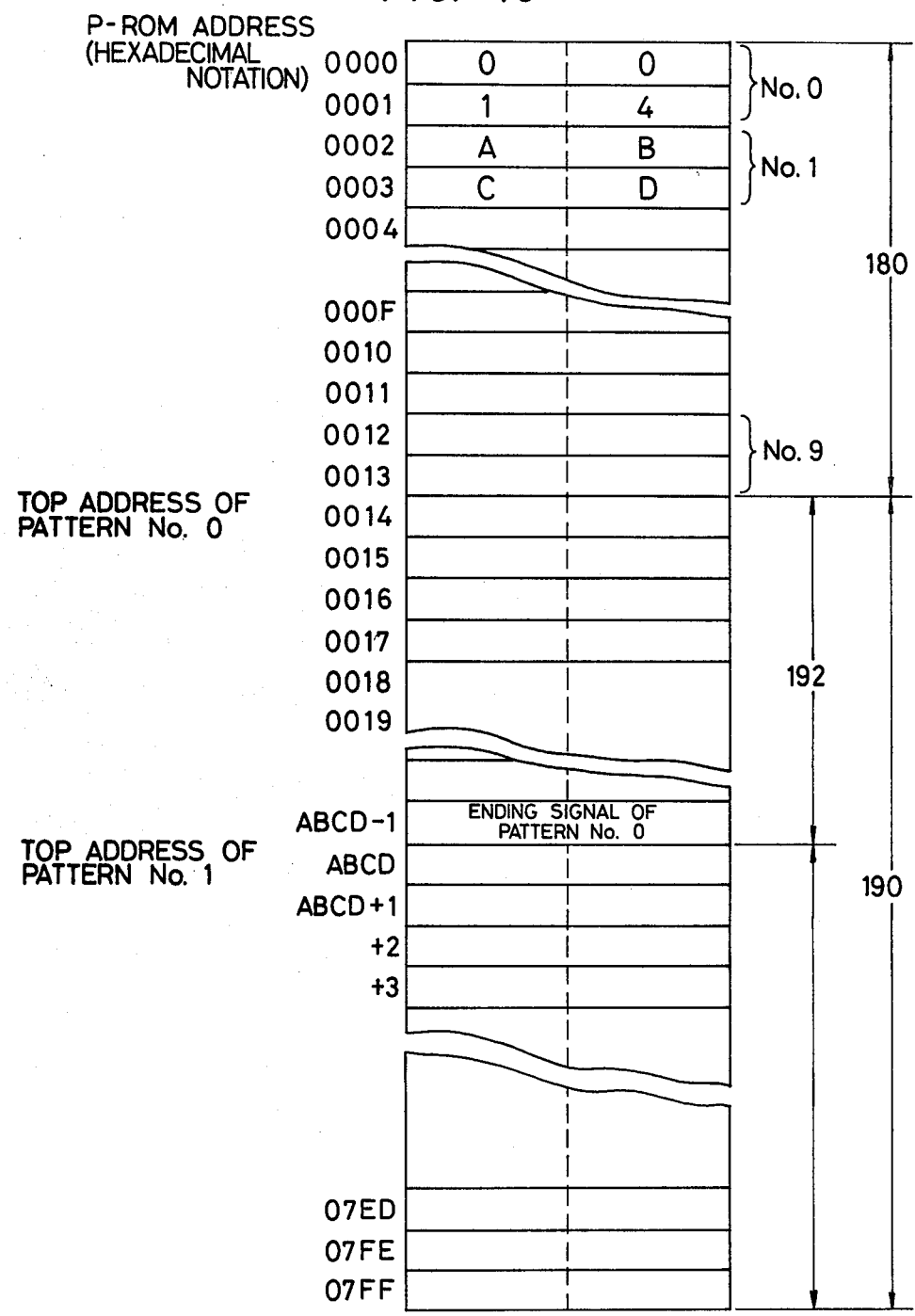
FIG. 10 is a view illustrating a data structure in a data storing medium in the apparatus for preparing and processing data according to the present invention.

Still another embodiment according to the present invention will be described with reference to FIG. 10 which illustrates a preferred form of a PROM that can be used as a non-volatile non-destructive medium for storing sewing data according to the present invention. The PROM has a content memory 180 at its top end and a data memory 190 contiguous to the content memory 180 for storing therein sewing data. In FIG. 10, the sewing data is stored in the PROM, and top addresses for the ten sewing data patterns No. 0–No. 9 are successively stored in the content memory 180. More specifically, a top address "0014" for the pattern No. 0 is stored at addresses "0000" and "0001", and a top address "ABCD" of the pattern No. 1 is stored at adjacent addresses "0002" and "0003". Likewise, a top address for the pattern No. 9 is stored at addresses "0012" and "0013" which are final addresses in the content memory 180. The data memory 190 stores the plurality of sewing data written therein successively in the order of the patterns. The sewing data of the pattern No. 0 is stored in a region 192 having addresses "0014" to "ABCD-1".

When sewing data written in the temporary memory (RAM) is to be transferred into a PROM, the data writing key 28c is actuated while the mode indicators 54 are flickering, whereupon the pattern number indicator 64 on the indicator panel 18 flickers to request the operator to select the number of a pattern to be written in a ROM inserted in the socket 22. The operator can now designate a desired pattern. When no such designation is necessary, the operator can actuate the data writing key 28c for automatic retrieval of a smallest empty pattern number in the ROM, the pattern number obtained being displayed on the numeral indicator 76.

Likewise, when sewing data in a prepared ROM mounted in the socket 22 is to be transferred into the temporary memory in the data preparation apparatus, a flickering indicator on the indicator panel 18 requests the operator to select a pattern number of the sewing data to be read out of the ROM. Upon designation of a desired pattern number, the CPU in the computer block 26 retrieves a corresponding top address from the content memory 180 in the PROM to cause sewing data corresponding to the retrieved top address to be read out of the data memory 190.

By selecting the full key 52a in the control key input section 16, all of the sewing data in the PROM can be read out in the order of addresses. Thus, sewing data can be reproduced simply and speedily without using the content memory 180.

While in the embodiment shown in FIG. 10 the content memory 180 is disposed at the top end of the addresses in the PROM, the content memory 180 may be located at the tail end of the addresses.

Figure 11:
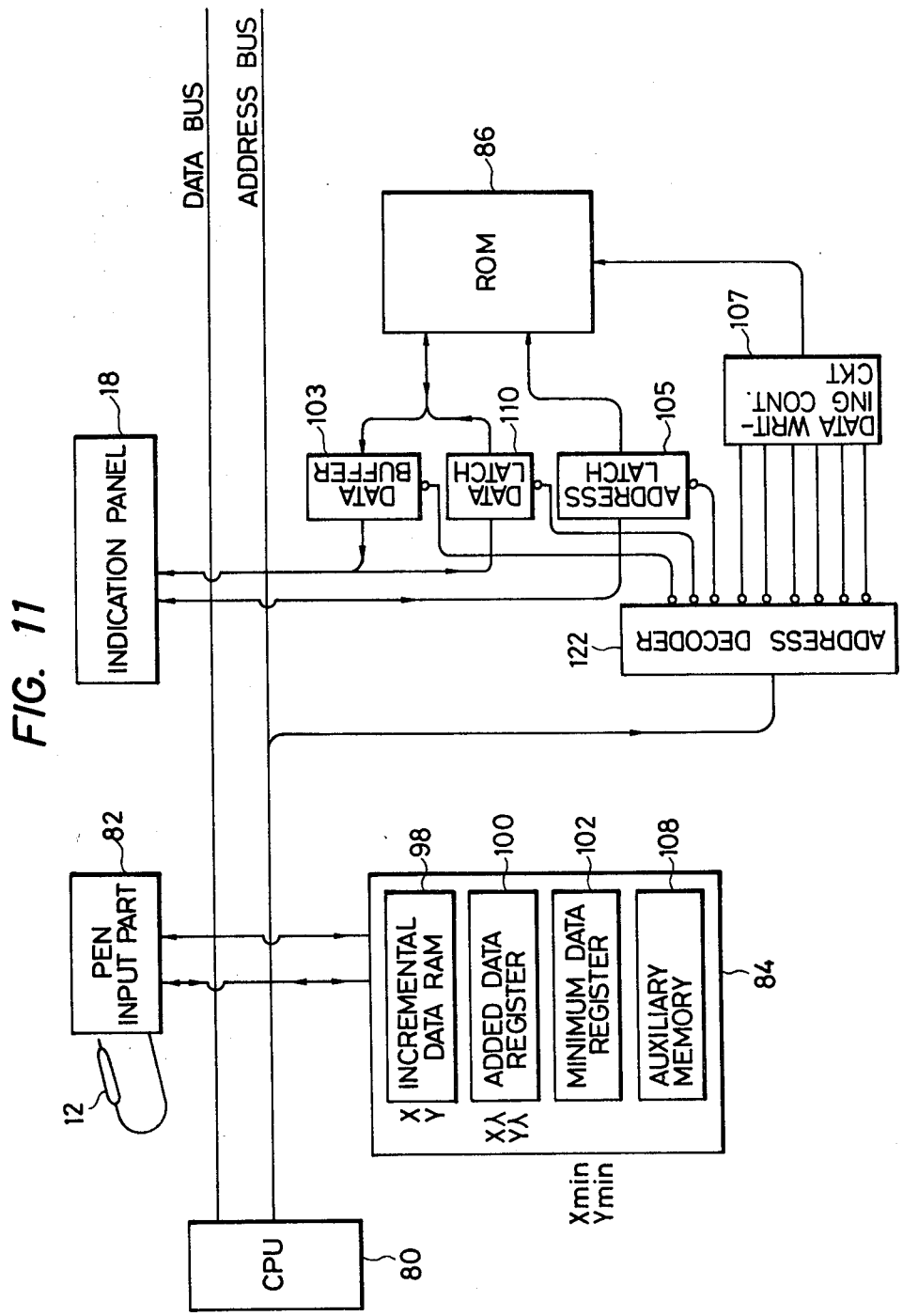
FIG. 11 is a block diagram illustrative of the way in which data is written into the data storing medium in the apparatus for preparing and processing data in accordance with the present invention.

FIG. 11 is a block diagram showing a still another embodiment for writing sewing data in the ROM. Designated in FIG. 11 at 103 is a data buffer, 110 a data latch, 105 an address latch, 106 an address decoder, 107 a writing control circuit, and 108 an auxiliary memory for data writing.

when the start check key 32 of FIG. 2 is actuated, the CPU 80 produces an output which enables data to be read out to a ROM 86. More specifically, the data buffer 103 and the address latch 105 are controlled, and the writing control circuit 107 supplies the ROM 86 with a signal. The CPU 80 further reads out of the content memory in the ROM 86 successively from the top address ("0014" in hexadecimal notation) for the pattern number 0, reads the top address for the final pattern stored in the ROM 86, and causes the auxiliary memory 108 in the RAM 84 to store these addresses and pattern numbers. Then, the CPU 80 reads the data of the final pattern successively from its top address, reads the address where an end signal for the final pattern is stored, or the final address in the memory region used by the ROM 86, and causes the auxiliary memory 108 in the RAM 84 to store these data and address.

By reading the final address, the CPU 80 computes an empty memory region in the ROM 86 and enables the auxiliary memory 108 in the RAM 84 to store the result of such computation.

The number of memory locations used for the sewing data written in the RAM 98 and the empty memory region are compared with each other, and if the empty memory region is greater, then a number next to the final pattern number and its top address are displayed on the pattern number indicator 76 and the top address indicator 78 on the indicator panel 18.

Then, the data in the RAM 98 is written in the ROM 86. At this time, the data latch 110 and the address latch 105 are energized by the address decoder, and the writing control circuit 107 renders the ROM 86 capable of writing sewing data therein. The top address (stored in the auxiliary memory in the RAM 84) where the sewing data in the RAM 98 is to be stored is written as allocated two bytes in the content memory 80 in the ROM 86, and at the same time the sewing data is stored successively at addresses beginning from the top address in the empty memory region in the ROM 86 or the top address where the sewing data in the RAM 98 is to be stored.

When the sewing data is properly written up to the END signal, the CPU 80 energizes the indicator lamp OK on the indicator panel 18.

If the empty memory region is smaller than the number of memories used for the sewing data, then the CPU 80 effects no writing and energizes the error indicator lamp 72b on the indicator lamp 18.

With the embodiment of FIG. 11, much sewing data can be efficiently stored in a single storing medium, and can be written in an empty memory region in a storing medium which has partly stored sewing data. In addition, sewing data which exceeds the empty memory region is prevented from being stored. The arrangement is advantageous from a practical standpoint in that it provides easier handling and more reliable data storage.

Figure 13:
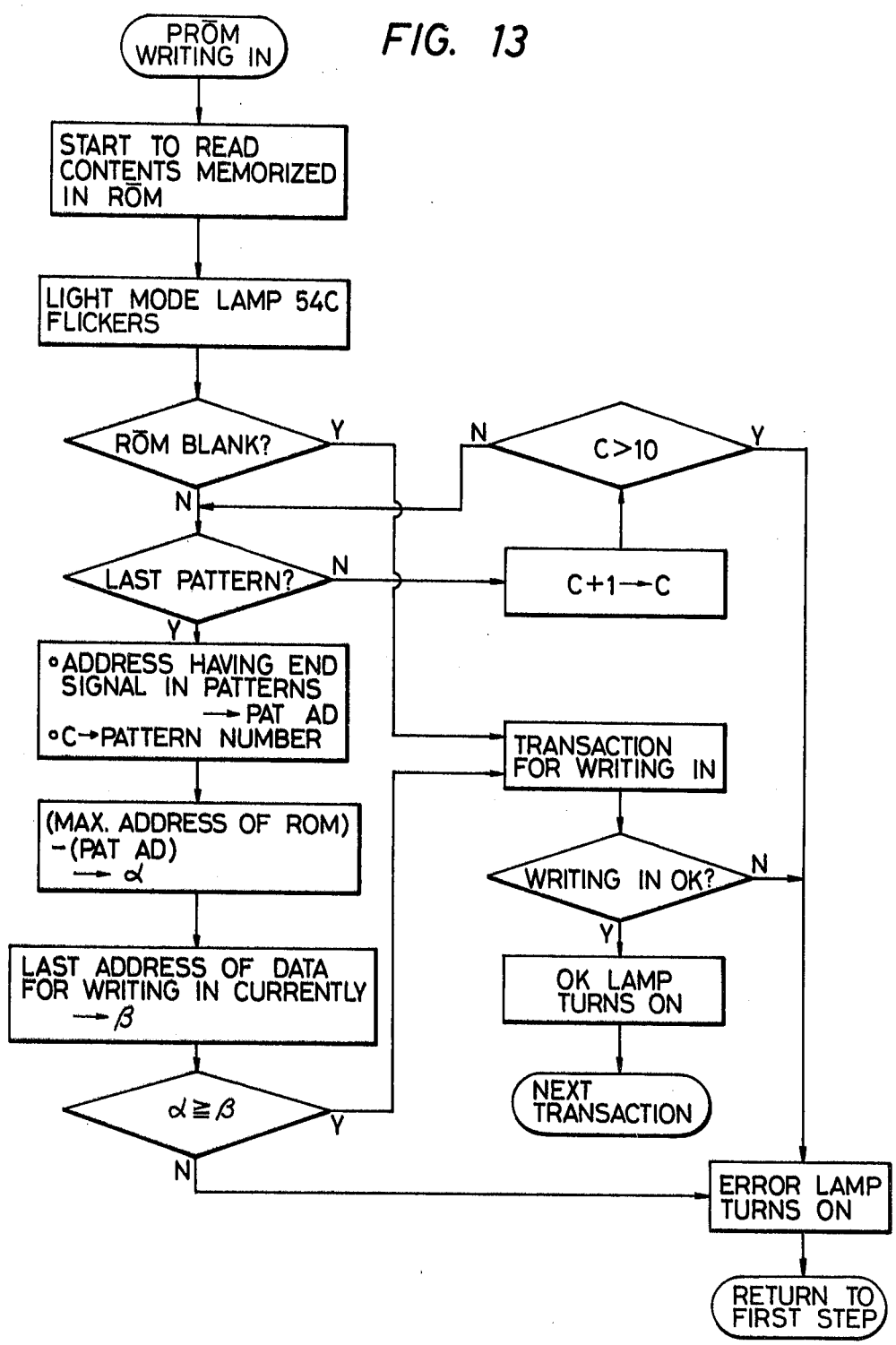
FIG. 13 is a flowchart related to the operation of the embodiment shown in FIG. 11.

FIG. 13 is a flow chart detailing the writing operation with the PROM used in the embodiment of FIG. 11.

What is claimed is:

1. A method for preparing sewing data and performing sewing operations in accordance with the prepared data, comprising the steps of:
    moving a hand-held stylus pen upon a data input board along a locus corresponding to a desired sewing pattern;
    storing in a random-access memory incremental data values representing said locus;
    displaying upon a cathode-ray tube monitor a pattern corresponding to said desired sewing pattern by reading out said incremental data values from said random-access memory in sequence and accumulating said incremental data values from a reference position upon a display surface of said cathode-ray tube monitor so that said pattern is clearly displayed for viewing by an operator;
    editing said incremental data values stored in said random-access memory to correct any errors noted in the pattern displayed on said cathode-ray tube monitor;
    transferring the edited incremental data values from said random-access memory to a nonvolitile data storing means along with incremental data values of other sewing patterns similarly prepared, each of said patterns being addressable only by a corresponding top address, said top addresses being stored sequentially in a predetermined portion of said nonvolitile data storing means;
    positioning a needle of a sewing machine head at a predetermined start location of a selected one of said patterns on fabric to be sewn;
    reading out from said nonvolatile data storing means in sequence incremental data values for said selected pattern by applying the top address corresponding to said selected pattern to said nonvolatile data storing means; and
    relatively positioning said fabric and said sewing needle in accordance with the incremental data values so read out to perform a sewing operation.

2. The method of claim 1, further comprising the step of indicating an erroneous operation when said stylus pen is operated erroneously.

3. The method of claim 2, wherein said step of indicating an erroneous operation comprises the step of indicating whether said erroneous operation is correctable or noncorrectable.

4. The method of claim 2, wherein said step of indicating said erroneous operation comprises actuating at least one of a lamp and a buzzer.

5. The method of clam 1, further comprising the step of inhibiting storing said incremental data values in said nonvolatile data storing means when a predetermined storage capacity of said random-access memory has been exceeded.

* * * * *